United States Patent Office 3,005,412
Patented Oct. 24, 1961

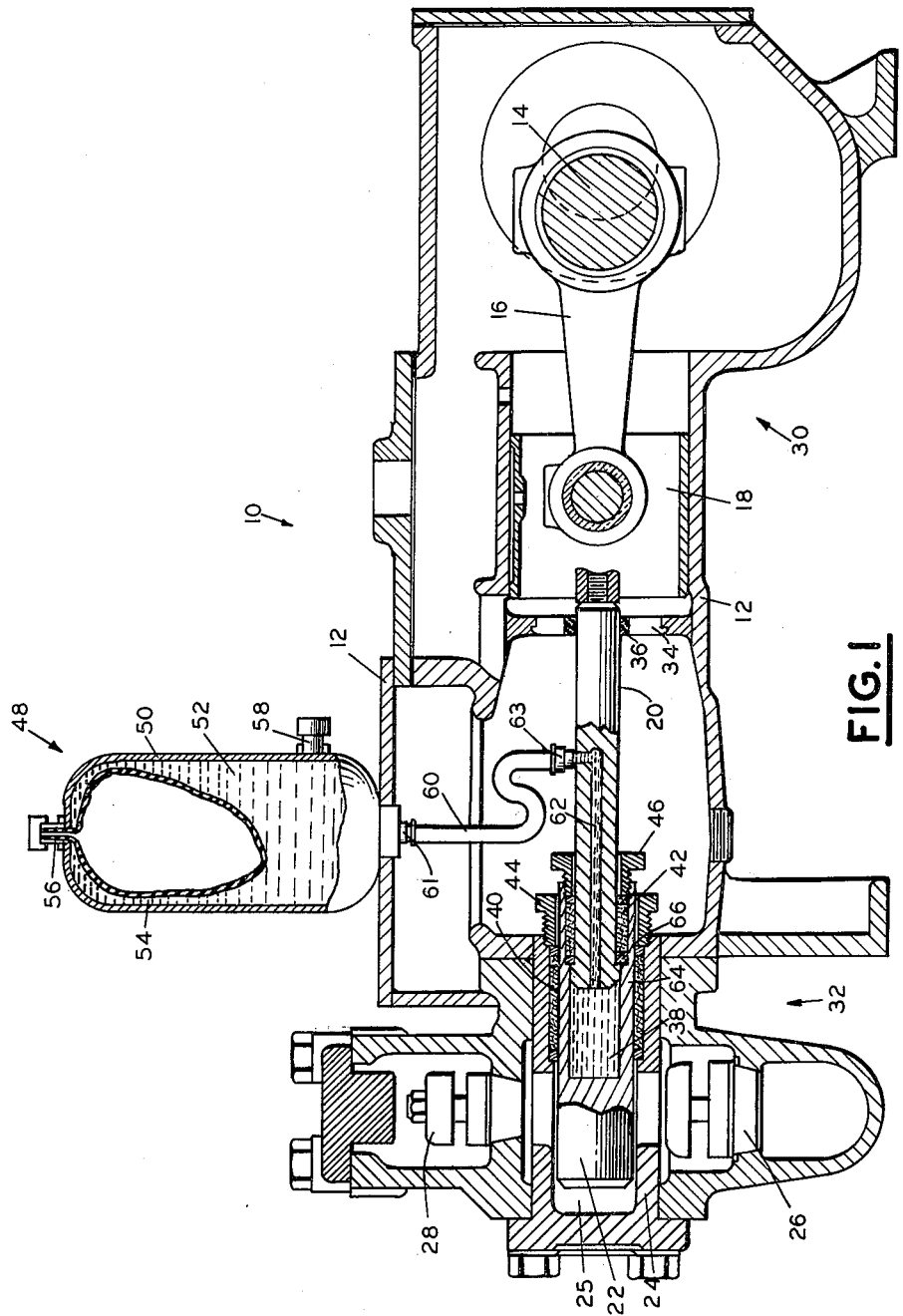

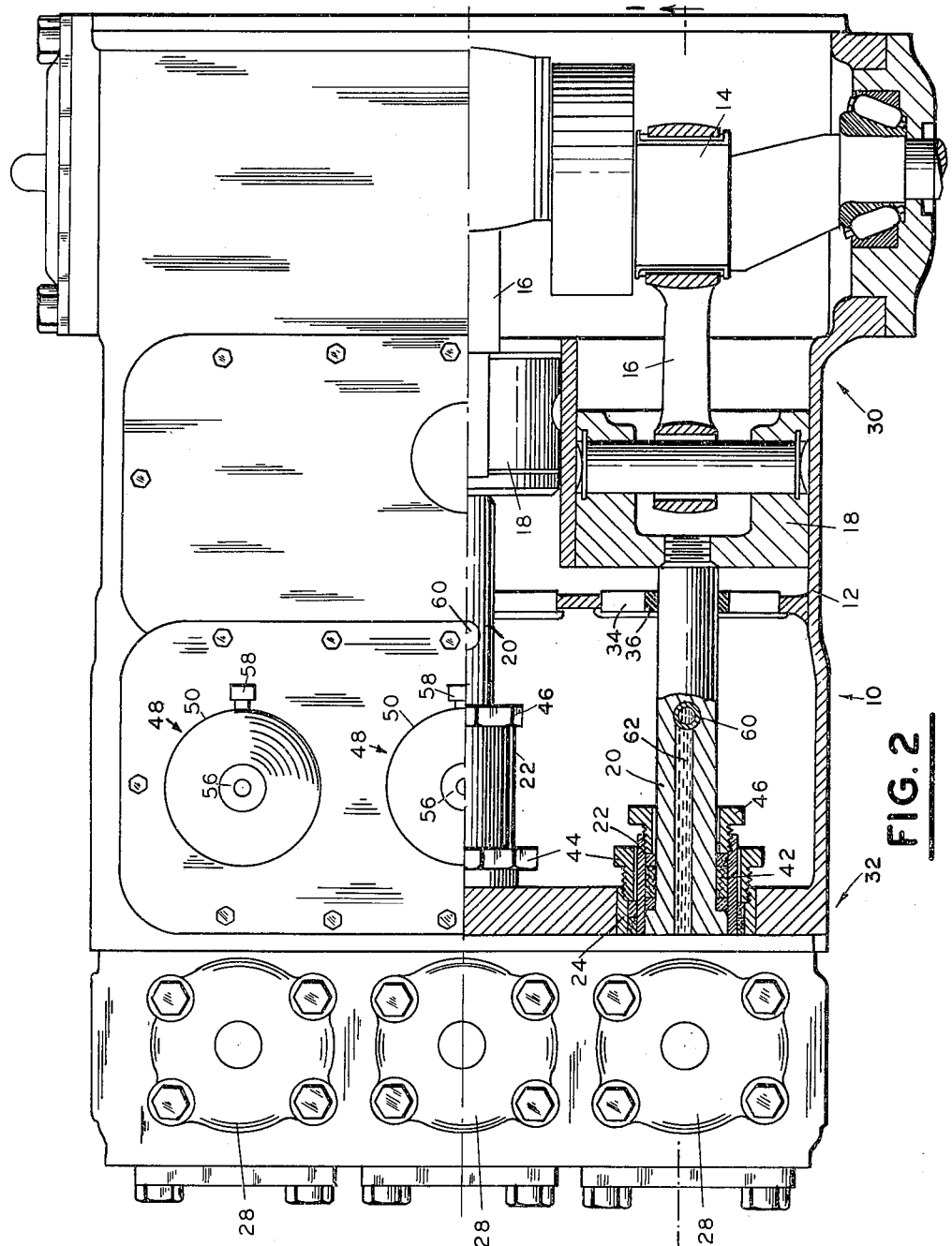

3,005,412
AUTOMATIC PRESSURE COMPENSATOR FOR RECIPROCATING PUMPS
George F. Camp, 1730 S. 75th Ave., Tulsa, Okla.
Filed Oct. 10, 1960, Ser. No. 61,651
3 Claims. (Cl. 103—38)

This invention relates to a reciprocating pump having ing means for automatic pressure compensation. More particularly, the invention relates to a means of automatically compensating a reciprocating pump for changes in pumping pressures whereby the maximum pressure on the power stroke of the pump will not exceed a predetermined limit.

Most reciprocating pumps are composed of the basic elements of a cylinder, an inlet valve, an outlet valve, a piston reciprocable actuated in the cylinder and a crankshaft adapted to actuate the piston. The piston moves forward on each rotation of the crankshaft a predetermined distance of travel equal to the throw of the crankshaft so that on each stroke of the piston a fixed volumetric displacement occurs within the cylinder. As the piston moves forward the volume in the interior of the cylinder is reduced, compressing the fluid or gas within the cylinder and forcing it out the outlet valve. If, for any reason, a restriction of flow in the outlet end of the pump develops, the pressures created by the action of the piston increase tremendously. When the pump is used to move noncompressible liquid, such as water, and the discharge side of the pump is closed off, the pressure within the cylinder of the pump can become so great that the plunger is not able to move forward. Due to the inertial energy in the pump and prime mover something must "give" in the pump, resulting in the rupture of the pump.

In the oil industry, reciprocating pumps are frequently used for moving salt water, especially for injecting salt water into underground formations. If the pump is running and an operator inadvertently closes a valve in the discharge line, the pump would be severely damaged. Presently, the means of eliminating this problem is providing a by-pass from the discharge to the intake side of the pump with a pressure operated valve in the line so that if the discharge side is closed fluid is by-passed and recirculated by the pump. This system works satisfactorily except that the by-pass network is expensive to install. When fluid is being pumped through the by-pass, for instance if the discharge side of the pump is closed to such an extent that a majority of the fluid being pumped is circulating through the by-pass, then the energy used to circulate the by-pass fluid is totally lost so that pumping efficiency suffers materially.

The present invention contemplates a novel type of reciprocating pump. Broadly stated, the invention may be defined as a pump adaptable for reciprocation by a prime mover, said comprising, a cylinder; a primary piston reciprocable in said cylinder, said primary piston having a cylindrical opening therein whereby the longitudinal axis of said cylindrical opening is substantially coincident with the longitudinal axis of said primary piston; a secondary piston reciprocable in said cylindrical opening of said primary piston, said secondary piston adaptable for reciprocable actuation by said prime mover; and hydraulic communication means between said primary and said secondary pistons whereby reciprocal motion of said secondary piston by said prime mover is hydraulically transmitted to said primary piston.

It is therefore an object of this invention to provide a positive displacement reciprocating pump wherein the maximum pressure exerted by the plunger of the pump within the cylinder is automatically adjustable.

Another object of this invention is to provide a reciprocating pump wherein the volume of fluid being pumped will automatically be adjusted with changes in the discharge pressure.

Another object of this invention is to provide a reciprocating pump having means whereby a closure of the fluid outlet of the pump while the pump is in operation will not result in damage to the pump.

Another object of this invention is to provide a reciprocating pump having a discharge flow patter of greatly improved characteristics wherein the volumetric displacement of the pump is more constant.

Another object of this invention is to provide a reciprocating pump having means whereby the discharge volume may be controlled so that the pump can function to move a variable volume of fluid or gas.

Another object of this invention is to provide a reciprocating pump wherein the volume automatically increases as the pressure drops and wherein the volume automatically decreases as the pressure rises.

Another object of this invention is to provide a reciprocating pump having characteristics permitting the pump to be operated at higher speeds and at improved efficiencies.

Another object of this invention is to provide a reciprocating pump which will be completely safe and which will not require a fluid by-pass arrangement.

Another object of this invention is to provide a reciprocating pump having an outer plunger, an inner plunger, and a hydraulic communication between the outer and inner plungers wherein the hydraulic pressure between the inner and outer plungers is maintained at a substantial even and predetermined amount.

Another object of this invention is to provide a pump including means of automatically decreasing the volume of fluid being pumped as the pressure increases and including means whereby the energy consumed as the volume of fluid pumped decreases is automatically reduced.

These and other objects and a better understanding of the invention may be had by referring to the following description and claims taken in conjunction with the attached drawings in which:

FIGURE 1 best discloses the invention. FIGURE 1 is a cross-sectional view of a reciprocating pump incorporating the principles of this invention. FIGURE 1 is taken along the line 1—1 of FIGURE 2.

FIGURE 2 is a top view, shown partially in cross-section, of a triplex reciprocating pump including the automatic pressure compensator principles of this invention.

Referring now to the drawings and first to FIGURE 1 a reciprocating pump is indicated generally by the numeral 10. Pump 10 is a typical reciprocating pump, modified to incorporate the principles of this invention. A housing 12 is provided which serves as the superstructure of the pump. Positioned within and supported by the housing 12 is a crankshaft 14 which is roated by a prime mover (not shown). Affixed to the crankshaft 14 is connecting rod 16 which extends to a crosshead member 18. The crosshead 18 is adaptable for sliding on a portion of the housing 12 so that a linear reciprocal motion is available for actuation of the pumping mechanism.

Affixed to crosshead 18 is an inner plunger member 20 which extends to engage pump outer plunger 22. A cylinder 24, having cylinder cavity 25, is supported to housing 12. Outer plunger 22 reciprocates within cylinder 24 so that on the reverse stroke of outer plunger 22 fluid is drawn into cylinder cavity 25 through intake valve 26. On the forward stroke of the plunger 22 fluid entrapped within cylinder cavity 25 is forced out through discharge valve 28.

The pump 10 may be divided into two major portions. The portion containing crankshaft 14 and crosshead 18 may be termed the power end 30 of the pump. The portion of the pump containing the cylinder 24 and piston 22 may be termed the fluid end 32 of the pump. Separating the power end 30 from fluid end 32 is a wiper box 34, containing wiper box packing 36 closely positioned around inner plunger 20. The function of the wiper box 34 is to prevent fluid or gases being pumped in the fluid end 32 from entering the power end 30 and likewise to prevent lubricating oil, which is required to lubricate the bearings of crankshaft 14 and crosshead 18, from escaping into the fluid end 32 of the pump 10.

In a typical reciprocating pump as commonly used today, inner plunger 20 is replaced by a piston rod which connects directly to outer plunger 22. Under the principles of this invention however, outer plunger 22 is provided with a cylinder chamber 38 in which inner plunger 20 is slideably inserted. Main cylinder packing 40 is provided around outer plunger 22 to prevent leakage of the fluid being pumped from out of cylinder cavity 25. Packing 42 is also provided between inner plunger 20 and cylinder chamber 38. Packing nuts 44 are provided as a means of maintaining packing 40 in a leak proof engagement around outer plunger 22. By removing packing nuts 44 packing 40 may be removed and replaced. Likewise, a packing nut 46 provides means for tightening packing 42 or for replacing packing 42 when it is worn.

Supported on housing 12 of pump 10 is a hydraulic accumulator, indicated generally by the numeral 48. The accumulator consists of an outer metal shell 50, an inner hydraulic fluid cavity 52, a flexible bag 54 contained within the fluid cavity 52, a nipple 56 communicating between the interior of flexible bag 54 and the exterior of outer metal shell 50, and a second nipple 58 communicating between the fluid cavity 52 and the exterior of shell 50.

A flexible hose 60 communicates between the fluid cavity 52 of hydraulic accumulator 48 and inner plunger 20. Hose end 61 connects hose 60 with metal shell 50. A fluid passage 62 is provided in inner plunger 20. Hose end 63 connects hose 60 with fluid passage 62. Hydraulic communication is maintained between cylinder chamber 38 through fluid passage 62 and hose 60 to fluid cavity 52 of hydraulic accumulator 48.

Inner plunger 20 has an integrally formed end portion 64 of slightly increased diameter. A hard substance packing ring 66 forms the forward portion of packing 42. As inner plunger 20 is withdrawn by movement of crosshead 18, the enlarged end portion 64 engages packing ring 62 to withdraw outer plunger 22.

Referring to FIGURE 2 a top view of a typical triplex reciprocating pump is shown adapted to include the principles of this invention. The pump of FIGURE 2 has three cylinders 24, three outer plungers 22, three inner plungers 20, and so forth. Positioned substantially above each of the three inner plungers 20 is a hydraulic accumulator 48. The principles of this invention are applicable to pumps having any number of cylinders and for each cylinder which is to be automatically pressure compensated there will be a separate hydraulic accumulator 48, or a single hydraulic accumulator 48 may be used having hydraulic communication with the cylinder chamber 38 of each piston 22.

Operation

The operation of the mechanism of this invention may be described as follows: With the crosshead 18 of the pump in the position that is shown in FIGURE 1, that is the maximum forward position, and as crankshaft 14 continues to rotate, crosshead 18 will be moved in the rearward direction. This withdraws inner plunger 20 and outer plunger 22 causing the creation of a larger cylinder cavity 25 which pulls fluid being pumped through inlet valve 26 into the cylinder cavity 25. When the crosshead 18 has reached the maximum rearward stroke, and as crankshaft 14 continues to rotate, crosshead 18 will begin to move forward moving inner plunger 20. Hydraulic pressure in cylinder chamber 48 causes outer plunger 22 is move forward with inner plunger 20. This forces the liquid within cylinder cavity 25 out of the pump through discharge valve 28.

To form a firm coupling between inner plunger 20 and outer plunger 22, cylinder chamber 38, flexible hose 60 and fluid cavity 52 of hydraulic accumulator 48 are filled with a hydraulic fluid. Flexible bag 54 is then subjected to a predetermined gas pressure and sealed. The gas pressure in the flexible bag 54 forces against the hydraulic fluid in fluid cavity 52 and exerts a continuous hydraulic pressure within the sealed system. This hydraulic pressure is imparted through hose 60 to cylinder chamber 38 so that a constant force is exerted between inner plunger 20 and outer plunger 22. This forces inner plunger 20 rearward with respect to outer plunger 22 until end portion 64 of the inner plunger 20 engages packing rings 66. Packing 42 prevents leakage of the hydraulic fluid out of the cylinder chamber 38. With hydraulic pressure maintained in cylinder chamber 38 the relative relationship of outer plunger 22 and inner plunger 20 will remain the same while the two plungers are reciprocated back and forth by movement of crosshead 18. This fixed relationship will apply as long as the force exerted between inner plunger 20 and outer plunger 22 exceeds the force exerted by outer plunger 22 against the liquid being pumped. The force in a hydraulic system is computed by the hydraulic pressure times the area on which the hydraulic pressure is exerted. The hydraulic force exerted between inner plunger 20 and outer plunger 22 would be the area measured in a plane perpendicular to the axis of end portion 64 of inner plunger 20 times the hydraulic pressure in cylinder chamber 38. When this force exceeds the force on outer plunger 22, which would likewise be computed at any instant as the hydraulic pressure in cylinder cavity 25 times the cross-sectional area of outer plunger 22, the force urging outer plunger 22 forward with respect to inner plunger 20 will continue to keep end portion 64 of inner plunger 20 in contact with packing rings 66.

As the head pressure on the pump 10 begins to build up, a point will occur wherein the force exerted against outer plunger 20 by fluid pressure in cylinder cavity 25 exceeds the force exerted by hydraulic fluid in cylinder cavity 38 against inner plunger 20. At this point inner plunger 20 will move forward with respect to outer plunger 22 causing fluid to be displaced from cylinder chamber 38 through fluid passage 62 and hose 60 into fluid cavity 52 of hydraulic accumulator 48. The increased flow of fluid into fluid cavity 52 will cause flexible bag 54 to further compress and be reduced in size. It can be seen then that the maximum pressure which will be exerted on fluid in cylinder cavity 25 by outer plunger 22 will be predeterminable by the amount of pneumatic pressure in flexible bag 54.

As an example of the application of this invention to protect reciprocating pumps, suppose that immediately after starting the reciprocating pump 10 to a valve blocking the discharge line (not shown) is closed. Fluid trapped in cylinder cavity 25 as outer plunger 22 begins to move forward will not have means of escaping and since most fluids are substantially noncompressible, some portion of the pump would have to give way, causing potentially expensive damage to the pump. With the principles of this invention applied however, even if outer plunger 22 stops in its most rearward position the crosshead 18 would continue to move forward compressing hydraulic fluid in chamber 38 and moving it into fluid chamber 52 of hydraulic accumulator 48. Thus, when the fluid flow through the discharge valve 28 of the pump is stopped reciprocation of crankshaft 14 can continue, the total linear movement of inner plunger 20 taking place between it and outer plunger 22. It can be seen then that provision of the automatic pressure compensator means of this invention makes possible a positive displacement pump which will not be damaged by over pressure in the discharge line.

As another indication of the functioning of the pressure compensator, suppose the fluid presusre on the discharge side of the pump begins to approach the predetermined maximum. As the outer plunger 22 begins to move forward in cylinder 24 on each stroke, pressure will gradually accumulate against the outer plunger 22. As long as the pressure is below the predetermined amount the hydraulic force in cylinder chamber 38 will continue to move the outer plunger 22 forward. At the point in the forward movement of outer plunger 22 when the predetermined maximum pressure occurs on the discharge side of the pump, the force on outer plunger 22 will overcome the hydraulic force in cylinder chamber 38 so that the forward movement of outer plunger 22 will stop and the balance of the forward motion of cross head 18 will occur between inner plunger 20 and outer plunger 22, moving fluid in fluid cavity 52. As the reverse movement of crosshead 18 begins hydraulic pressure in fluid cavity 52 of hydraulic accumulator 48 will force inner plunger 20 rearward relative to outer plunger 22 until the end portion 64 engages packing ring 66, at which point outer plunger 22 will begin to move rearward. In this manner it can be seen that at critical pressures the outer plunger 22 may move only one-half of the full stroke length of crankshaft 14. Or it may move three-fourths of its normal full stroke length or only one-fourth or any amount between 0 movement and the maximum stroke length of crankshaft 14. This effect has a tendency to maintain the discharge pressure of the pump substantially constant. As the discharge pressure begins to fall, the outer plunger 22 will make longer stroke lengths, pumping larger volumes of fluid which would tend to raise the discharge pressure. As the discharge pressure begins to build up the stroke length of outer plunger 22 shortens, pumping less fluid, which tends to permit the discharge pressure to reduce. This effect reduces the pulsating flow experienced with other reciprocating pumps. The peak hydraulic output pressures are absorbed by movement of inner plunger 20 within outer plunger 22, producing a more even, continuous and nonpulsating fluid flow through the pump.

When the discharge pressure on the pump reaches a predetermined maximum so that substantially all of the reciprocating movement occurs between inner plunger 20 and outer plunger 22, most of the energy consumed on the forward motion of inner plunger 20 relative to outer plunger 22 is stored in the hydraulic accumulator 48 as increased pneumatic pressure in flexible bag 54. On the rearward stroke of the pump, when crosshead 18 begins to move backward, this energy to returned to the pump as flexible bag 54 expands forcing fluid through tube 60 into cylinder chamber 38. Energy therefore, is not consumed by the pump except in proportion to fluid passing through discharge valve 28. Whereas in the usual reciprocating pump, as the fluid outlet pressure increases the efficiency of the pump, per unit of volume of fluid passed, diminishes rapidly. By the principles of this invention, only energy required to move fluid at pressures below the predetermined maximum is utilized in the pump, the hydraulic accumulator storing the excess energy on the forward motion of inner plunger 20 and returning it on the rearward motion. This means that the energy demand of the reciprocating pump utilizing the automatic compensation means of this invention remains much more uniform and consistent than occurs in other direct displacement pumps wherein the energy requirements as the pressure increases goes up proportionally.

As has been previously mentioned, one means of preventing the destruction of a reciprocating pump if the discharge outlet is closed is the provision of a by-pass wherein fluid is recirculated through the pump. Fluid recirculation consumes large requirements of energy compared to the principles of this invention wherein the fluid is not recirculated but wherein the stroke of the outer plunger 22 is shortened and the energy hydraulically stored and returned to the system on each stroke.

Flexible hose 60 may be looped in a number of ways so that minimum flexing of the hose occurs as the inner plunger 20 reciprocates back and forth in operation. As an alternate arrangement, a slide valve arrangement may be utilized to communicate hydraulic pressure from fluid cavity 52 to fluid chamber 38, obviating the requirement of flexible hose 60.

The hydraulic accumulator 48 including a flexible bag 54 is shown as one example of a means whereby relatively uniform hydraulic pressure may be maintained between inner plunger 20 and outer plunger 22. Flexible bag 54 may be eliminated and the upper portion of the fluid cavity 52 filled with gas. The mechanism of the invention would function exactly the same. The flexible bag 54 is useful in preventing the escape of air into the hydraulic system and the absorption of gas by the hydraulic fluid in fluid cavity 52. Another means of maintaining consistent hydraulic pressure within cylinder chamber 38 would include a piston type accumulator wherein flexible bag 54 is replaced with a piston positioned within fluid cavity 52 under spring pressure. The advantage of the pneumatic means of maintaining hydraulic pressure in cylinder chamber 38 is that there is less inertial retardation of fluid volume changes than would occur with a piston and spring arrangement. Other means of maintaining predetermined hydraulic pressures in fluid chamber 38 will suggest themselves.

An alternate embodiment of the invention includes filling fluid chamber 38 with a gas under pressure. This method eliminates the requirements of hydraulic accumulator 48 and flexible hose 60. When outer plunger 22 is retarded in its forward movement, for any of the reasons previously mentioned, forward movement of plunger member 20 is absorbed in the compression of the gas in chamber 38. The function, advantages, and mode of operation of the pump 10 utilizing compressed gas in fluid chamber 38 is essentially the same as has been described utilizing hydraulic accumulator 48.

The invention has been described wherein the inner plunger 20 has been affixed to be reciprocated by crankshaft 14 to actuate within a larger outer plunger 22. This invention includes the alternate arrangement wherein the outer plunger 22 may be affixed to be reciprocated by crankshaft 14 to actuate a smaller inner plunger 20 which may operate within the pump cylinder 24. The selection of arrangements would depend upon the pumping pressures desired.

The invention has been described as it applies to a triplex reciprocating pump. The scope of the invention includes the application of this device to pumps having one or any greater number of cylinders.

Although this invention has been described with a certain degree of particularity, it is manifested that many changes may be made in these details of construction and the arrangement of components without departing from the spirit and scope of this disclosure.

I claim:

1. A pressure compensated pump adaptable for actuation by a prime mover, comprising, in combination, a cylinder; an inlet valve in communication with said cylinder; an outlet valve in communication with said cylinder; a cylindrical primary piston adaptable for reciprocable actuation in said cylinder whereby on the rearward movement of said piston fluid enters said cylinder through said inlet valve and on the forward movement of said primary piston fluid is expelled from said cylinder through said outlet valve, said primary piston having a cylindrical opening therein, the cylindrical axis of said opening substantially coinciding with the cylindrical axis of said primary piston; a cylindrical secondary piston adaptable to be reciprocably actuated by said prime mover, said secondary piston having the forward portion thereof slideably positioned in said cylindrical opening of said primary piston, said secondary piston having a longitudinal fluid passage formed therein, said fluid passage communication at one end with said opening in said primary piston and terminating at the other end exterior said secondary piston; a flexible hose communicating at one end with said fluid passage at the second mentioned end thereof; and a hydraulic pressure means in communication with the second end of said flexible hose whereby hydraulic force is applied through said hose and said fluid passage maintaining hydraulic pressure between said primary piston and said secondary piston.

2. A pump according to claim 1 wherein said secondary piston includes an enlarged diameter, integrally formed end portion; packing means affixed to said primary piston disposed to snuggly engage said primary piston; and a packing ring forming the forward most element of said packing means adaptable to engage said enlarged end portion of said secondary cylinder whereby said secondary cylinder is maintained in slideable engagement with said primary cylinder.

3. A pump according to claim 1 wherein said hydraulic pressure means includes a closed metal container in communication with said second end of said flexible hose; said container having contained therein hydraulic fluid; a flexible bag disposed within said metal container, the exterior surface of said bag in contact with said hydraulic fluid and the interior of said flexible bag having communication with the exterior of said metal container whereby pneumatic pressure is applied to said bag whereby exterior surface of said bag exerts pressure on said hydraulic fluid.

References Cited in the file of this patent

UNITED STATES PATENTS

| 1,764,458 | McLean | June 17, 1930 |
| 2,458,821 | Anderson et al. | Jan. 11, 1949 |
| 2,711,697 | Gibbs | June 28, 1955 |
| 2,807,215 | Hawxhurst | Sept. 24, 1957 |
| 2,936,712 | Van Gerpen | May 17, 1960 |

FOREIGN PATENTS

| 766,305 | Great Britain | Jan. 16, 1957 |